United States Patent
Seitz et al.

(10) Patent No.: US 10,274,928 B2
(45) Date of Patent: Apr. 30, 2019

(54) CONTROL SYSTEM, OPERATOR CONSOLE AND MOBILE DATA CARRIER FOR A MACHINE TOOL

(71) Applicants: DMG MORI CO., LTD., Yamatokoriyama-shi, Nara (JP); DMG MORI AKTIENGESELLSCHAFT, Bielefeld (DE)

(72) Inventors: Reinhold Seitz, Hopferau (DE); Alexander Strebelow, Wasserburg (DE)

(73) Assignees: DMG MORI CO., LTD., Yamatokoriyama-shi (JP); DMG MORI AKTIENGESELLSCHAFT, Biefeld (DE)

( * ) Notice: Subject to any disclaimer, the term of this patent is extended or adjusted under 35 U.S.C. 154(b) by 274 days.

(21) Appl. No.: 15/021,730

(22) PCT Filed: Sep. 11, 2014

(86) PCT No.: PCT/EP2014/069407
§ 371 (c)(1),
(2) Date: Mar. 14, 2016

(87) PCT Pub. No.: WO2015/036492
PCT Pub. Date: Mar. 19, 2015

(65) Prior Publication Data
US 2016/0224009 A1    Aug. 4, 2016

(30) Foreign Application Priority Data
Sep. 13, 2013 (EP) ..................................... 13184341

(51) Int. Cl.
*G05B 19/402* (2006.01)
*G05B 19/409* (2006.01)
(Continued)

(52) U.S. Cl.
CPC ......... *G05B 19/402* (2013.01); *G05B 19/401* (2013.01); *G05B 19/409* (2013.01); *G05B 2219/36133* (2013.01); *H01R 13/5227* (2013.01)

(58) Field of Classification Search
CPC ... G05B 19/402; G05B 19/409; G05B 19/401
See application file for complete search history.

(56) References Cited

U.S. PATENT DOCUMENTS

| | | | | | |
|---|---|---|---|---|---|
| 5,391,968 | A | * | 2/1995 | Niwa | G05B 19/408 318/567 |
| 6,017,118 | A | * | 1/2000 | Gasvoda | B41J 2/17513 347/86 |

(Continued)

FOREIGN PATENT DOCUMENTS

| | | |
|---|---|---|
| CN | 101385205 A | 3/2009 |
| DE | 10 2007 041 768 A1 | 3/2009 |

(Continued)

OTHER PUBLICATIONS

Feb. 13, 2014 Search Report issued in European Patent Application No. 13 18 4341.

(Continued)

*Primary Examiner* — Mohammad Ali
*Assistant Examiner* — Vincent W Chang
(74) *Attorney, Agent, or Firm* — Oliff PLC

(57) ABSTRACT

A system for control of a numerically controlled machine tool by a user, including an operator console being operable by the user and a mobile data carrier, and to an operator console and a mobile data carrier for use in such system. The operator console has a receiving slot for receiving the mobile data carrier and a first communication interface adapted to be communicably connected to a second communication interface of the mobile data carrier, wherein the second communication interface includes a female connec- (Continued)

Figure 1:
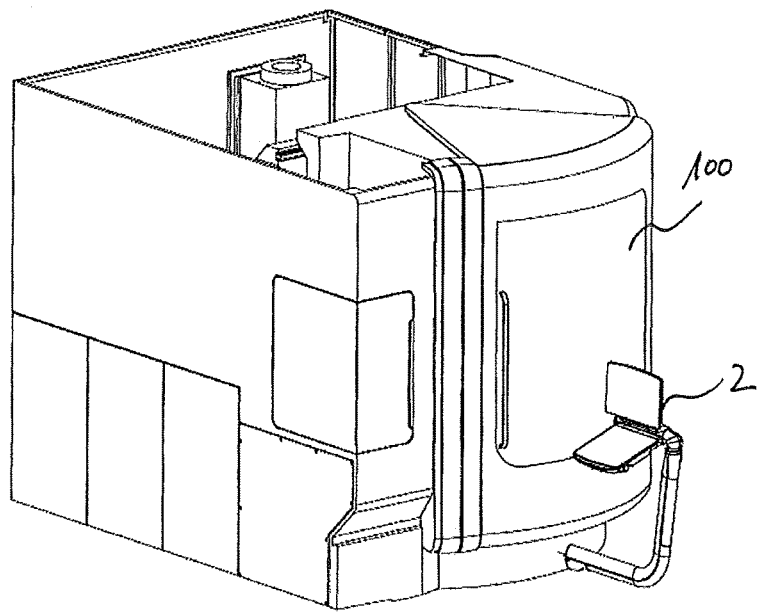

tor socket and the first communication interface includes a male connector plug provided at an inner end face portion of the receiving slot for being plugged into the female connector socket of the mobile data carrier when the mobile data carrier is received in the receiving slot.

16 Claims, 10 Drawing Sheets

(51) Int. Cl.
*G05B 19/401* (2006.01)
*H01R 13/52* (2006.01)

(56) References Cited

U.S. PATENT DOCUMENTS

| | | | | |
|---|---|---|---|---|
| 2002/0163440 | A1* | 11/2002 | Tsui | G08C 19/28 340/12.23 |
| 2009/0204240 | A1 | 8/2009 | Ait Yacine | |
| 2011/0143569 | A1 | 6/2011 | Mito et al. | |
| 2013/0151111 | A1* | 6/2013 | Skelton | B60R 25/00 701/99 |
| 2014/0191041 | A1* | 7/2014 | Zhao | G06K 19/0723 235/492 |

FOREIGN PATENT DOCUMENTS

| | | |
|---|---|---|
| DE | 10 2008 008 646 A1 | 8/2009 |
| EP | 1 990 872 A1 | 11/2008 |
| EP | 2 151 726 A2 | 2/2010 |
| GB | 2 233 170 A1 | 1/1991 |

OTHER PUBLICATIONS

Jun. 2, 2017 Office Action issued in Chinese Patent Application No. 201480048673.2.

Mar. 15, 2017 Office Action issued in European Patent Application No. 13184341.9.

Oct. 5, 2017 Office Action issued in European Patent Application No. 13184341.9.

* cited by examiner

A-A

C-C

CONTROL SYSTEM, OPERATOR CONSOLE AND MOBILE DATA CARRIER FOR A MACHINE TOOL

The present invention relates to a system for control of a numerically controlled machine tool by a user, comprising an operator console being operable by the user and a mobile data carrier, and to an operator console and a mobile data carrier for use in such system.

DE 10 2007 041 768 A1 shows an access control device set up to control access by a user to a machine tool by use of a mobile data carrier which is communicably connectable to a control device of an operator console of a numerically controlled machine tool by means of a communication interface, for example, so that the control device can read identification data from a storage means of the mobile data carrier which uniquely identifies the particular user and allows to determine access rights of the user by the control device.

However, there arises the problem that each user uses his own mobile data carrier and needs to connect it to the control device of the machine tool each time the machine tool is to be used by the user. For a factory operating plural machine tools and having plural users thereof, this means that plural mobile data carriers of the plural users are repeatedly connected to and disconnected from the control device of a certain machine tool by different users each day of production of workpieces.

In view of the above problem, it is desirable that the connection between the control device and the mobile data carrier can be efficiently and reliably established physically as well as with regard to efficiently and reliably enabling data exchange every time even in case of high number of connection attempts by different users by at the same time causing as low as possible wearing effects over long times.

For solving the above problem, according to the present invention, there is proposed a control system according to claim 1, and an operator console according to claim 14 and a mobile data carrier according to claim 15. Dependent claims relate to preferred embodiments of the present invention.

According to a first aspect of the present invention, there is proposed a system for control of a numerically controlled machine tool by a user. The system comprises an operator console being operable by the user and a mobile data carrier.

According to the first aspect, the operator console has a control device for control of the machine tool and a receiving member having a receiving slot for receiving the mobile data carrier, wherein the control device of the operator console has a first communication interface adapted to be communicably connected to a second communication interface of the mobile data carrier.

According to the first aspect, the second communication interface includes a female connector socket and the first communication interface includes a male connector plug provided at an inner end face portion of the receiving slot for being plugged into the female connector socket of the mobile data when the mobile data carrier is received in the receiving slot.

Accordingly, there can be provided an advantageous connectability between the mobile data carrier and the control device of the operator console of the machine tool involving a connection in which the mobile data carrier as a physical male connection part can be inserted into the receiving slot of the control device of the operator console of the machine tool as a physical female connection part, wherein the communication connection is, however, established by the female connector socket of the mobile data carrier and the male connector plug of the control device of the operator console of the machine tool.

Accordingly, on the one hand, the connector of the control device as a male connector plug can be reliably protected against damage by being embedded into and by being covered by the receiving slot, preferably not extending out of the receiving slot, and, on the other hand, the connector of the mobile data carrier can be reliably protected against damage by being realized as the female connector socket, which preferably does not extend out of a protective casing of the mobile data carrier. At the same time, the communication connection can be efficiently and reliably established.

In the first aspect, the mobile data carrier may have an elongated casing which has an upper outer side and a lower outer side opposite to the upper outer side, and which has an insertion portion being formed at a first end of the mobile data carrier on the side of the female connector socket. The receiving slot may have an elongated shape having an upper inner side and a lower inner side opposite to the upper inner side.

It is preferable that a cross-sectional shape of a receiving portion of the receiving slot is at least partially adapted to fit a cross-sectional shape of the insertion portion of the casing of the mobile data carrier, in particular such that the insertion portion of the mobile data carrier is insertable into the receiving portion of the receiving slot only such that the first outer side of the casing of the mobile data carrier faces the first inner side of the receiving slot and the second outer side of the casing of the mobile data carrier faces the second inner side of the receiving slot.

Accordingly, this provides the advantage that the cross-sectional shape of the insertion portion of the mobile data carrier and the cross-sectional shape of the receiving portion of the receiving slot are adapted to each other in such way that the data mobile carrier can only be inserted into the receiving slot in the correct orientation so as to avoid damage of the connectors which could happen by erroneous insertion by the user which can be prevented by fitting the shape of the cross-sections such that the mobile data carrier can only be inserted such that the first outer side of the casing of the mobile data carrier faces the first inner side of the receiving slot and the second outer side of the casing of the mobile data carrier faces the second inner side of the receiving slot.

Also, the shape and size of the receiving slot being adapted to fit to the shape and size of the mobile data carrier advantageously prevents any tilting movements of the mobile data carrier so that damage of the connected connectors by tilting the mobile data carrier can reliably be avoided and this further prevents the insertion of other objects than the mobile data carrier into the receiving slot so that damage of the male connector plug by other objects can reliably be avoided as well.

According to a preferred aspect, the cross-sectional shape of the receiving portion of the receiving slot is preferably at least partially formed to fit the cross-sectional shape of the insertion portion of the mobile data carrier such that movement of the mobile data carrier into directions perpendicular to an insertion direction of the insertion slot is preferably blocked and/or such that rotation of the mobile data carrier about the insertion direction is preferably blocked, when the insertion portion of the mobile data carrier is received in the receiving portion of the receiving slot. This provides the advantage that rotations of the inserted mobile data carrier are physically blocked by the wall portions of the receiving slot so that the connectors can be protected against damage even more advantageously and reliably. It further avoid rotation of the mobile data carrier while being inserted into the receiving slot, thereby making sure that the male and female connectors are connected in the correct position and orientation, thereby further protecting the connectors from any damage during establishing the connection.

According to another preferred aspect, an opening of the receiving slot preferably has a larger width than a width of the insertion portion of the mobile data carrier, and a width of a front portion of the receiving slot preferably decreases from the opening to the receiving portion of the receiving slot; and/or the opening of the receiving slot preferably has a larger height than a height of the insertion portion of the mobile data carrier, and a height of the front portion of the receiving slot preferably decreases from the opening to the receiving portion of the receiving slot. This has the advantage that inserting the mobile data carrier into the opening of the receiving slot is made easier for the user but due to a tapered shape of the portion between the opening and the receiving portion can be guided to the correct position and orientation to be inserted into the receiving portion.

According to another preferred aspect, the casing of the mobile data carrier preferably has a holding portion being formed at a second end of the mobile data carrier on the opposite side of the female connector socket, wherein a cross-sectional shape of the holding portion of the casing of the mobile data carrier is preferably formed such that the holding portion is blocked by the cross-sectional shape of the receiving portion of the receiving slot. This has the advantage that the mobile data carrier cannot be inserted with the wrong end into the receiving slot so that damage of the male connector plug by erroneous backward insertion of the mobile data carrier can be reliably prevented.

According to another preferred aspect, the receiving portion of the receiving slot preferably has at least one first stopper portion and the insertion portion of the casing of the mobile data carrier preferably has at least one second stopper portion, the at least one first stopper portion being preferably adapted to come into contact with the at least one second stopper portion for blocking movement of the mobile data carrier into an insertion direction, when the insertion portion of the mobile data carrier is inserted into the receiving portion of the receiving slot up to a fully inserted position of the mobile data carrier. This has the advantage that the insertion movement of the mobile data carrier into the receiving slot is advantageously prevented by physical blocking portions so that the insertion movement is not blocked by the connectors themselves, thereby, reliably preventing damage of the connectors due to a too high insertion force being applied by the user when inserting the mobile data carrier.

According to another preferred aspect, the receiving portion of the receiving slot preferably has at least one guiding protrusion and the insertion portion of the casing of the mobile data carrier preferably has at least one guiding groove adapted to fit the at least one guiding protrusion of the receiving portion, the at least one guiding protrusion preferably being adapted to engage with the at least one guiding groove when inserting the insertion portion of the casing of the mobile data carrier into the receiving portion of the receiving slot.

Also or alternatively, the receiving portion of the receiving slot preferably has at least one guiding groove and the insertion portion of the casing of the mobile data carrier preferably has at least one guiding protrusion adapted to fit the at least one guiding groove of the receiving portion, the at least one guiding protrusion preferably being adapted to engage with the at least one guiding groove when inserting the insertion portion of the casing of the mobile data carrier into the receiving portion of the receiving slot.

This provides the advantage that the insertion movement of the mobile data carrier into the receiving slot can be reliably guided in a correct orientation by the guiding grooves and guiding protrusions engaging in the guiding grooves. In addition, the incorrect insertion of the mobile data carrier into the receiving slot and insertion of other objects can be prevented because insertion requires that the guiding grooves are engaged by the guiding protrusions and are blocked otherwise.

In the above aspects, it is especially a preferable aspect that the at least one guiding groove has the at least one first and/or second stopper portion, or the at least one guiding protrusion has the at least one first and/or second stopper portion.

In another preferred aspect, the casing of the mobile data carrier preferably comprises an outer frame portion being made of metal. This provides the advantage that wearing off of the casing of the mobile data carrier can be avoided.

According to another preferred aspect, the female connector socket of the mobile data carrier preferably is a female USB socket and the male connector plug of the control device preferably is a male USB plug.

Accordingly, a cost effective and reliable USB connection can be established between the mobile data carrier and the control device of the machine tool. However, completely different from other mobile data carriers such as USB sticks, the mobile data carrier has the female USB socket and the operator console has a male USB plug being embedded within and covered by the receiving slot.

This provides two advantages, namely the first advantage is that a general USB stick cannot be inadmissibly connected even if insertable into the receiving slot because the USB stick would have a male USB plug being not compatible with the male USB plug inside the receiving slot, and the second advantage is that the USB connectors are protected from damage more efficiently compared to USB stick to computer connections because the mobile data carrier does not have an exposed fragile male USB connector and the mobile data carrier cannot be inserted in wrong directions and wrong orientations.

In total, while the life cycle of typical USB sticks being plugged to female USB sockets is less than 5000 connections, a mobile data carrier according to this aspect can have more than twice or even triple the life cycle before any damage may occur to the connector.

According to another preferred aspect, the control device is preferably configured to enable the user to control a plurality of available control functions of the machine tool depending on an authorization level and/or access rights of the user.

Preferably the mobile data carrier has first storage means storing access authorization data being indicative of the authorization level and/or access rights of the user, and the control device is preferably adapted to read access authorization data stored in the first storage means via an established connection between the first and second communication interfaces for determining the authorization level and/or access rights of the user.

In an alternative preferred aspect, the mobile data carrier preferably has first storage means storing access authorization data being indicative of the authorization level and/or access rights of the user and a second storage means storing configuration data and/or control data, and the control device of the operator console preferably has a wireless third communication interface and the mobile data carrier preferably has a wireless fourth communication interface.

Then, the mobile data carrier is preferably adapted to be communicably connected to the control device of the operator console via a wireless first connection being established between the wireless third and fourth communication interfaces and via a second connection being established between the first and second communication interfaces, when the mobile data carrier is received in the receiving slot of the operator console.

Further preferably, the control device is preferably adapted to read access authorization data stored in the first storage means via the established wireless first connection for determining the authorization level and/or access rights of the user and is preferably further adapted to read configuration data from the second storage means via the established second connection for configuring the control device and/or control data for controlling operation of the machine tool based on the control data.

In a further preferred aspect, the control device is preferably further adapted to write configuration data and/or control data to the second storage means via the established second connection; and/or the first storage means preferably is a read-only memory for preventing the control device to overwrite or alter data stored in the first storage means. This has the advantage that data in the second storage means can be altered, added, removed by the user or the control device as needed, while authorization data stored in the first storage means cannot be altered or modified.

In a further preferred aspect, the wireless third communication interface of the control device preferably is an RFID reader and the wireless fourth communication interface of the mobile data carrier preferably is an RFID transponder.

In a further preferred aspect, a bottom of the receiving slot comprises a dirt opening provided at an inner end portion of the receiving slot allowing dirt being pushed into the receiving slot by the inserted mobile data carrier to be removed from the receiving slot. This has the advantage that it can be reliably avoided that dirt may accumulate inside the receiving slot over time because dirt being pushed into the receiving slot by the inserted mobile data carriers can fall out of the receiving slot through the dirt opening.

According to a second aspect of the present invention, there is proposed an operator console for use in a system for control of a numerically controlled machine tool by a user according to any one of the above first aspect and preferred aspects thereof.

According to the second aspect, the operator console may comprise a control device for control of the machine tool, and a receiving slot for receiving a mobile data carrier, which has an elongated casing having an upper outer side and a lower outer side opposite to the upper outer side, and which has an insertion portion being formed at a first end of the mobile data carrier on the side of a female connector socket. The receiving slot may have an elongated shape having an upper inner side and a lower inner side opposite to the upper inner side.

According to the second aspect, the control device of the operator console may have a first communication interface adapted to be communicably connected to a second communication interface of the mobile data carrier, and the first communication interface may include a male connector plug provided at an inner end face portion of the receiving slot for being plugged into the female connector socket of the mobile data carrier when the mobile data carrier is received in the receiving slot.

Also, in the second aspect, a cross-sectional shape of a receiving portion of the receiving slot may be at least partially adapted to fit a cross-sectional shape of the insertion portion of the casing of the mobile data carrier such that the insertion portion of the mobile data carrier is insertable into the receiving portion of the receiving slot only such that the first outer side of the casing of the mobile data carrier faces the first inner side of the receiving slot and the second outer side of the casing of the mobile data carrier faces the second inner side of the receiving slot.

According to a third aspect of the present invention, there is proposed a mobile data carrier for use in a system for control of a numerically controlled machine tool by a user according to any one of the above first aspect and preferred aspects thereof.

According to the third aspect, the mobile data carrier may comprise a second communication interface including a female connector socket and an elongated casing having an upper outer side and a lower outer side opposite to the upper outer side, and having an insertion portion being formed at a first end of the mobile data carrier on the side of the female connector socket.

According to the third aspect, the mobile data carrier may be adapted to be insertable into a receiving slot of an operator console being operable by the user having a control device for control of the machine tool, the receiving slot having an elongated shape having an upper inner side and a lower inner side opposite to the upper inner side, and the second communication interface of the mobile data carrier may be adapted to be communicably connected to a first communication interface of the control device, wherein the female connector socket of the mobile data carrier is adapted to be connected to a male connector plug provided at an inner end face portion of the receiving slot when the mobile data carrier is received in the receiving slot.

Also, in the third aspect, a cross-sectional shape of the insertion portion of the mobile data carrier may be at least partially adapted to fit a cross-sectional shape of a receiving portion of the receiving slot such that the insertion portion of the mobile data carrier is insertable into the receiving portion of the receiving slot only such that the first outer side of the casing of the mobile data carrier faces the first inner side of the receiving slot and the second outer side of the casing of the mobile data carrier faces the second inner side of the receiving slot.

According to a preferable aspects of the first through thirds aspects, the control device is preferably adapted to determine, whether the user is authorized to upload data from the second storage means of the mobile data carrier based on the access authorization data stored in the first storage means of the mobile data carrier, and to enable communication via the established second connection only if it is determined that the user is authorized to upload data from the second storage means of the mobile data carrier.

In another preferred aspect, the configuration data may comprise at least one of: settings configuration data for automatically configuring settings of an operating system of the control device in accordance with preferences and/or access rights of the user; application installation data adapted to install and/or update an application program at the control device for enhancing and/or adding control and operation functions available at the control device; application configuration data for automatically configuring one or more of a plurality of applications of the control device which are related with operation, control and monitoring functions of the machine tool in accordance with preferences and/or access rights of the user; tool configuration data indicative of tool properties of a tool to be equipped at the machine tool and or tool configuration data indicative of information which tools should be used by the machine tool during an operation function in order to machine a working piece, and at which places of a tool magazine of the machine tool these tools are located; and operation function configuration data used by an operation function of the machine tool as input data.

Preferably, the control data comprises at least one of: numerical control program code data for automatically controlling a relative movement between a tool and a workpiece at the machine tool; calibration control data for automatically controlling one or more calibration operations at the machine tool; and workpiece model data indicative of a model of a workpiece to be machined at the machine tool.

Preferably, the control device of the operator console is adapted to store output data in a storage means of the mobile data carrier via the established communication connection, the output data comprising at least one of: operation function output data generated during execution of an operation function of the machine tool; machining history data related to the machining history of one or more workpieces machined at the machine tool; and operation history data related to the history of operation functions of the machine tool which have been selected/controlled by the user in the past.

Figure 2:
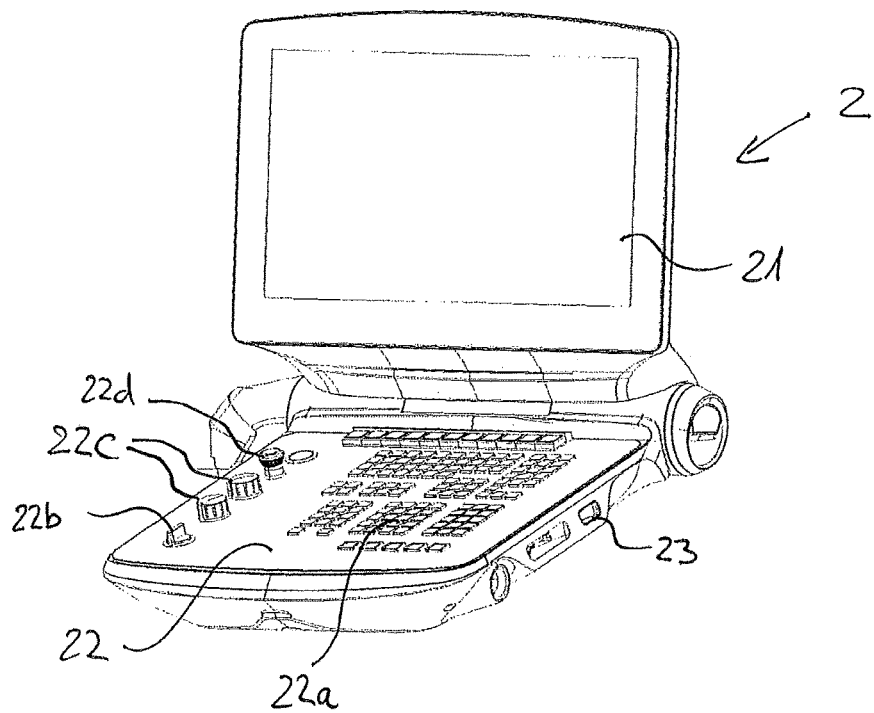
Figure 3A:
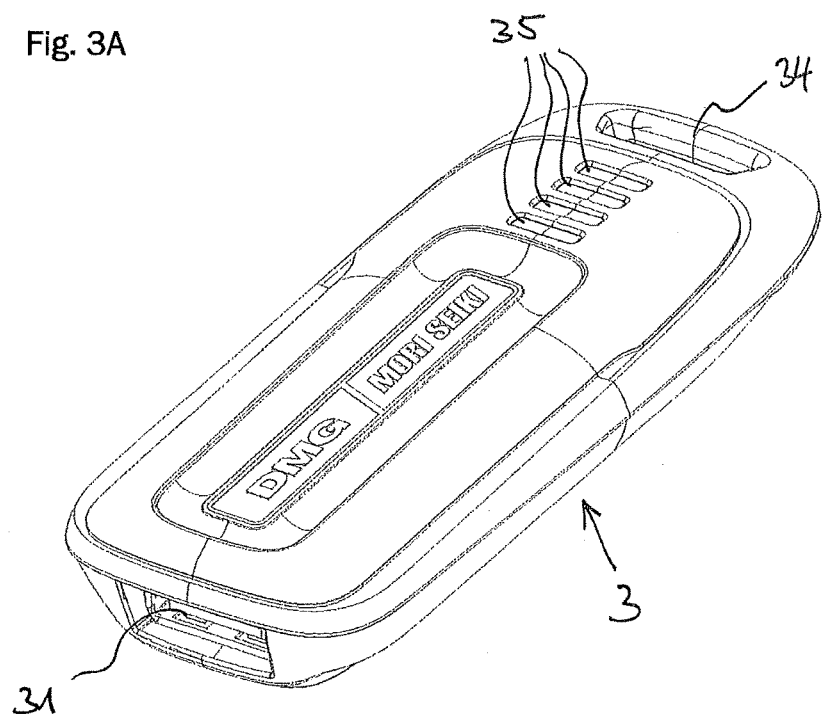
Figure 3B:
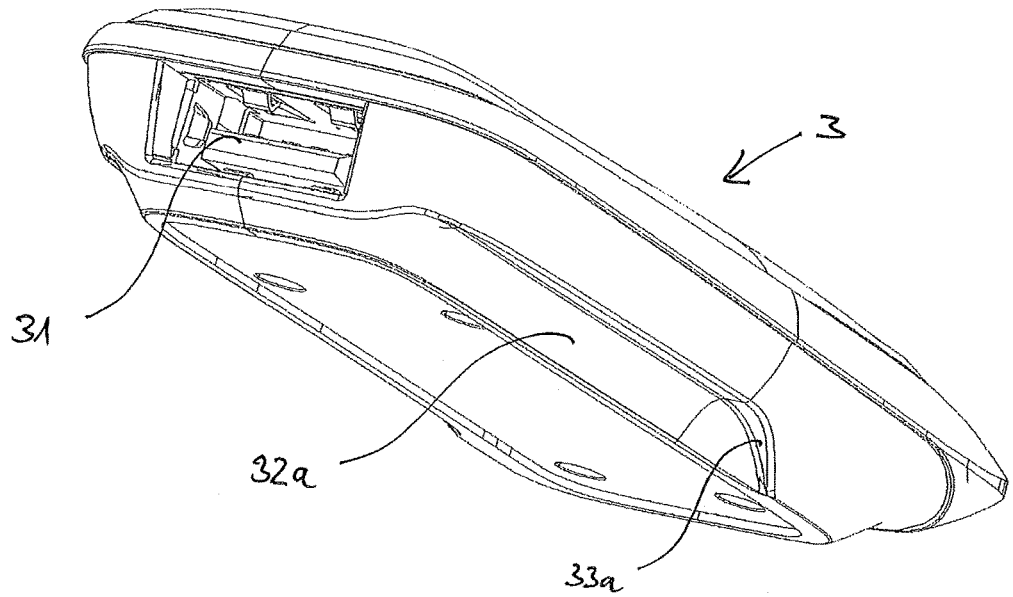
Figure 3C:
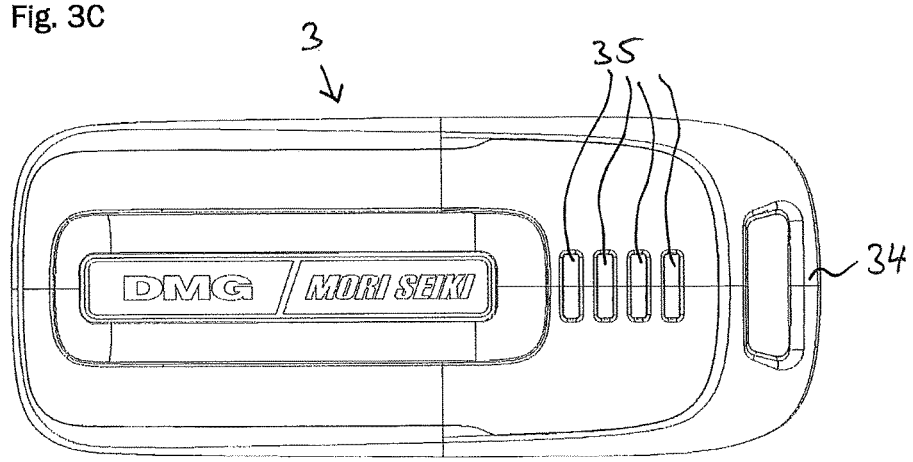
Figure 3D:
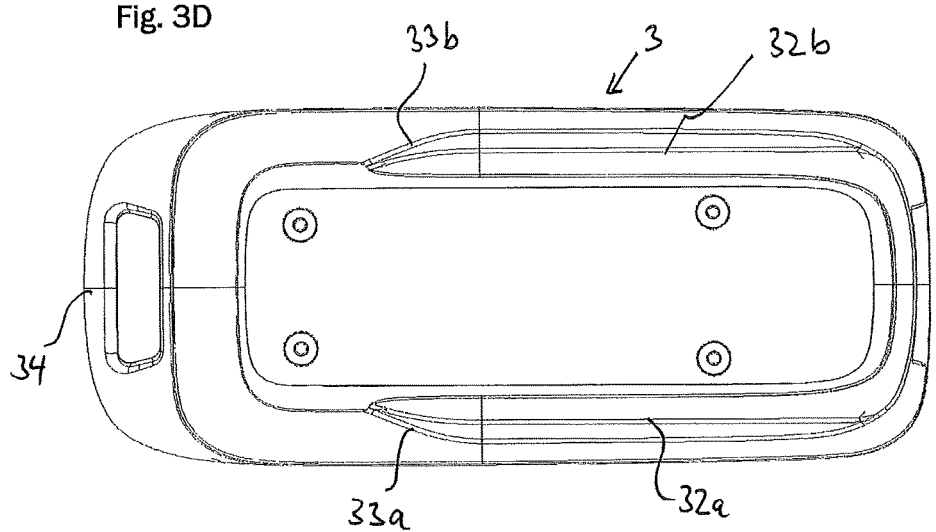
Figure 3E:
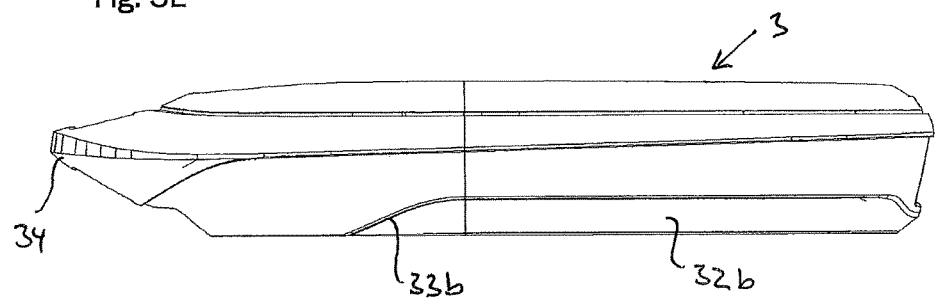
Figure 3F:
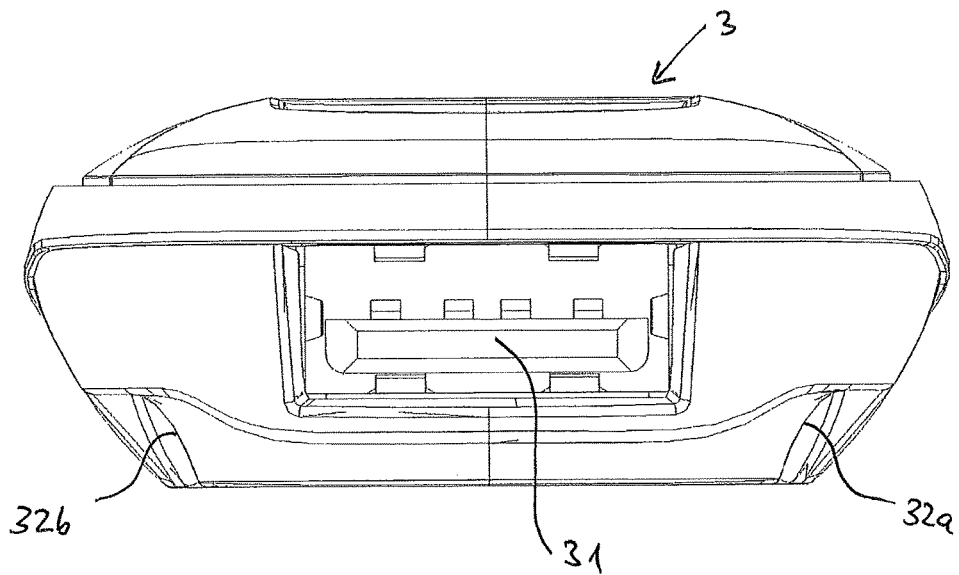
Figure 3G:
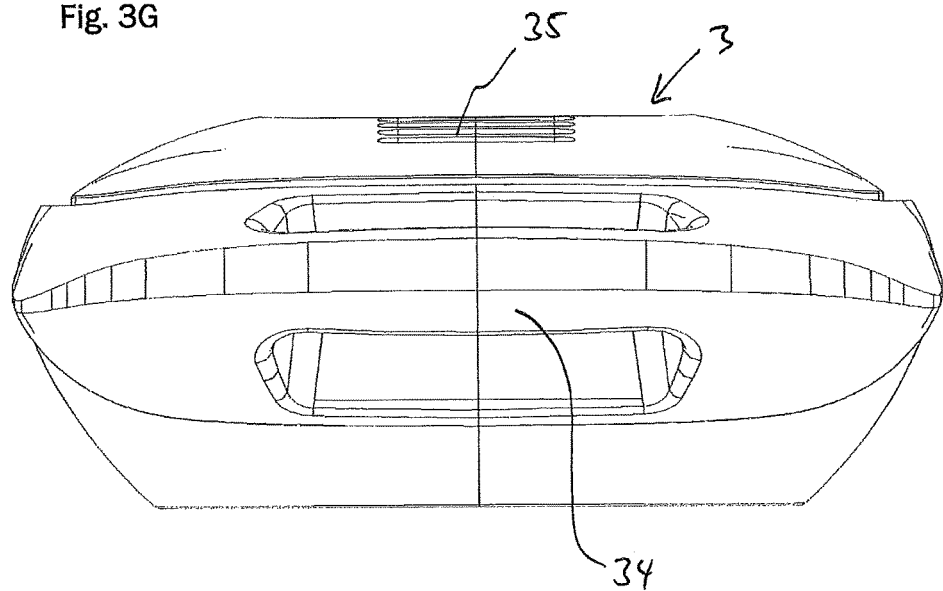
Figure 4A:
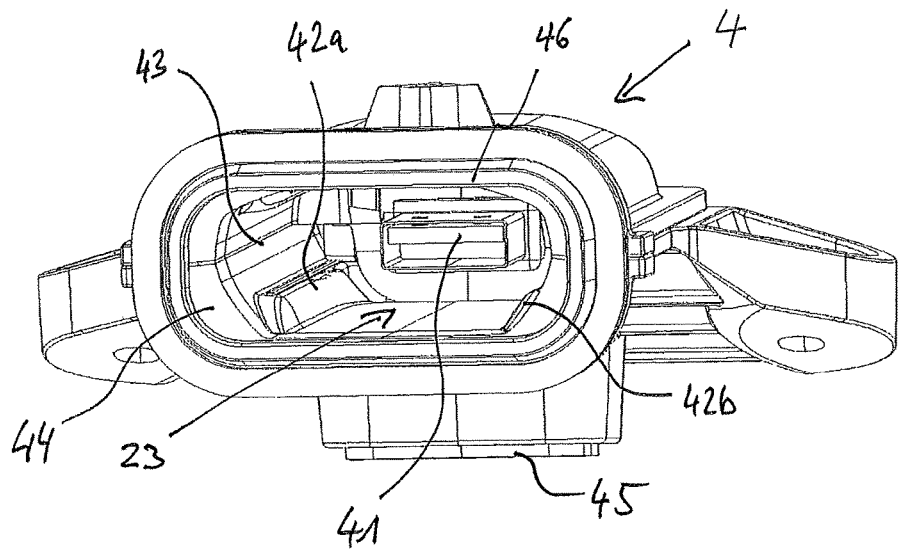
Figure 4B:
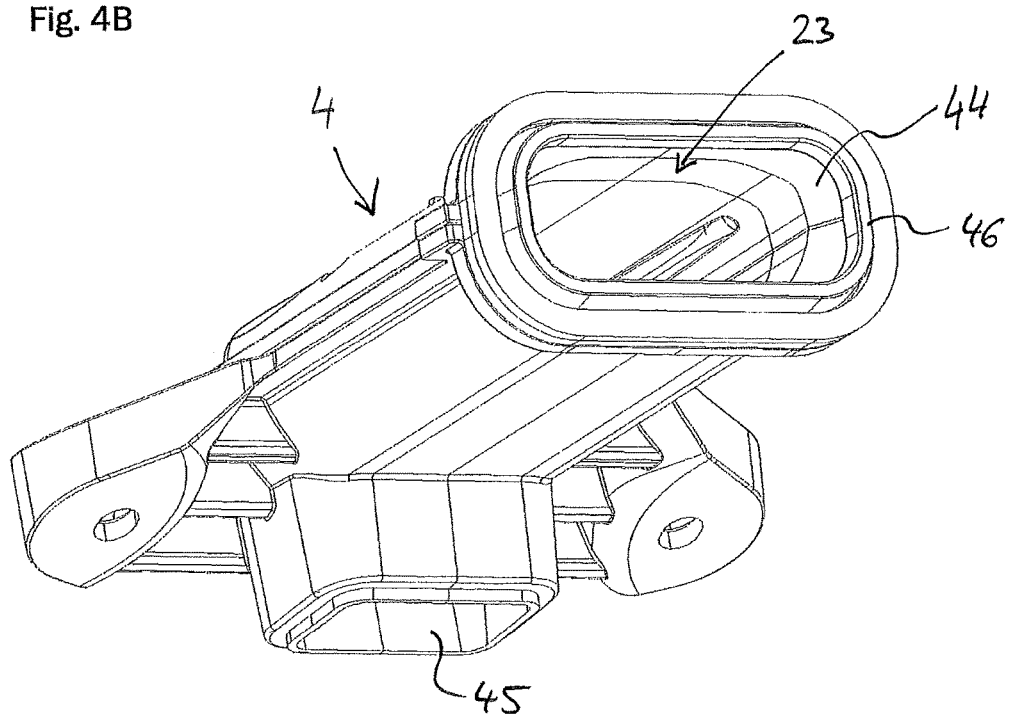
Figure 4C:
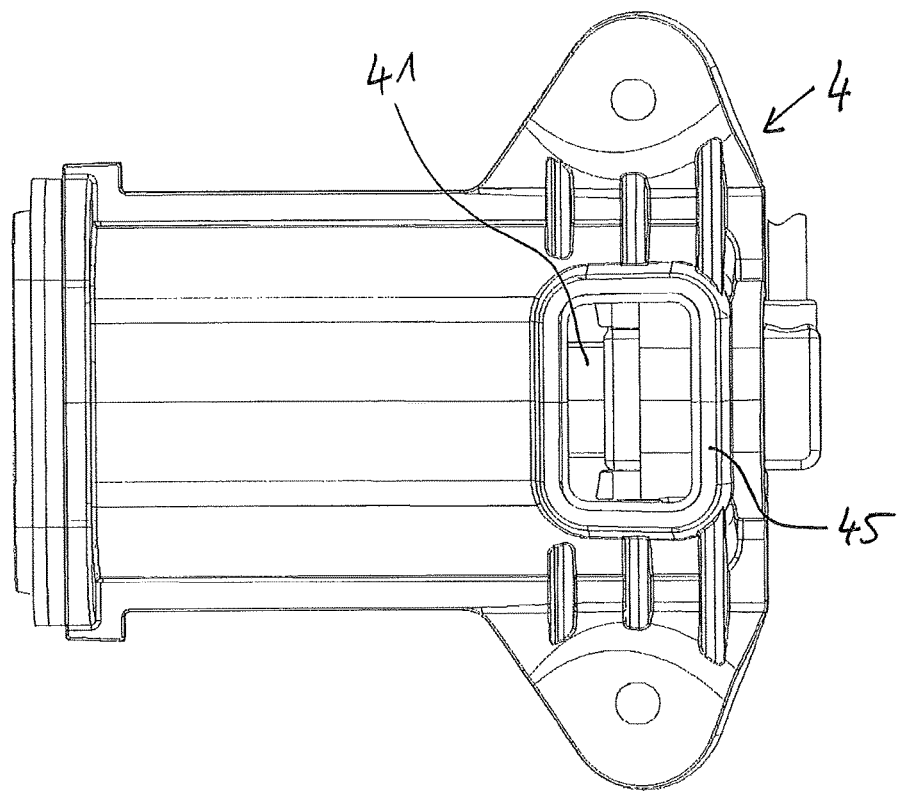
Figure 4D:
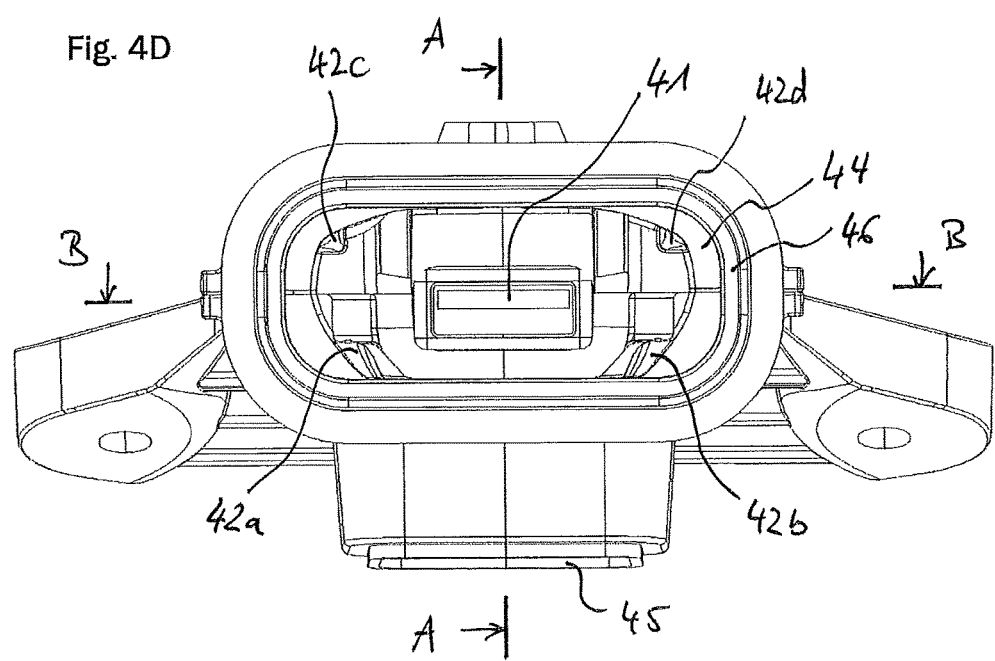
Figure 4E:
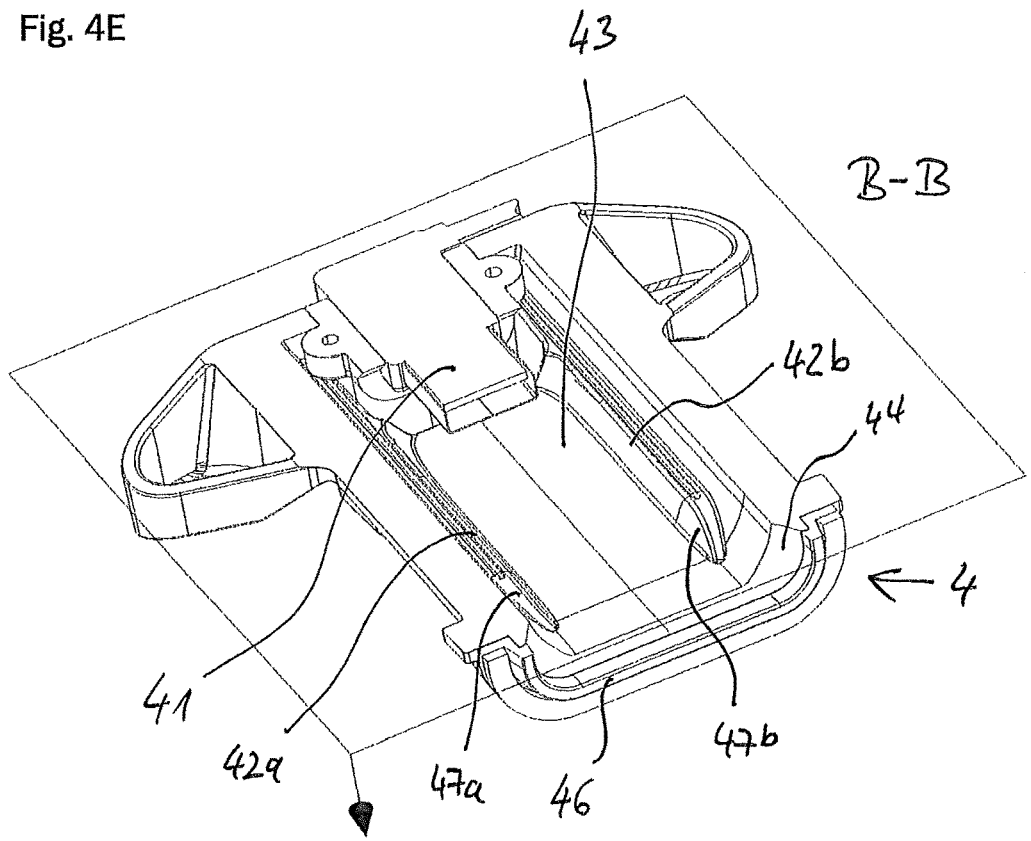
Figure 4F:
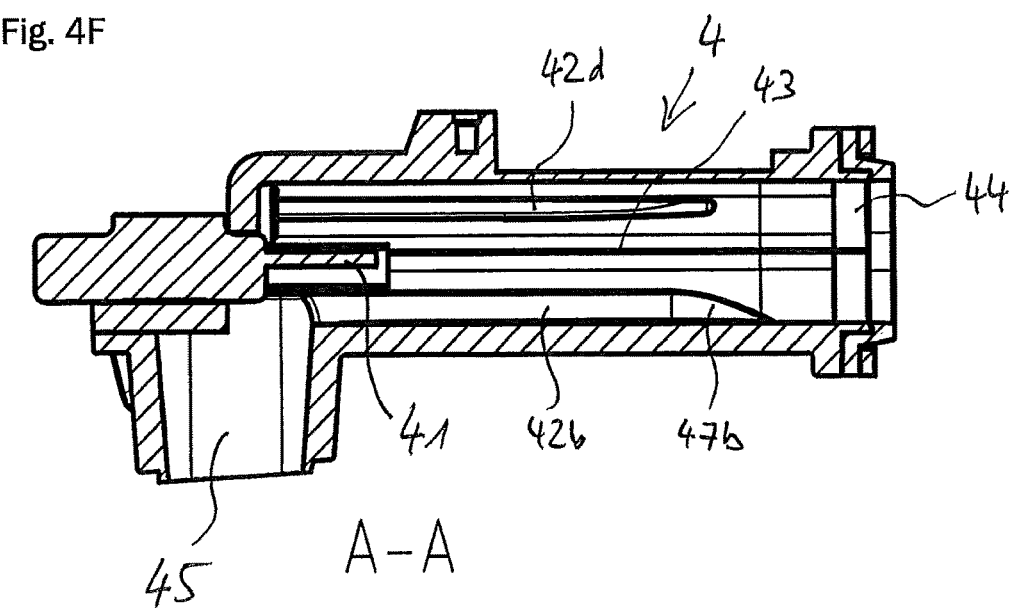
Figure 5A:
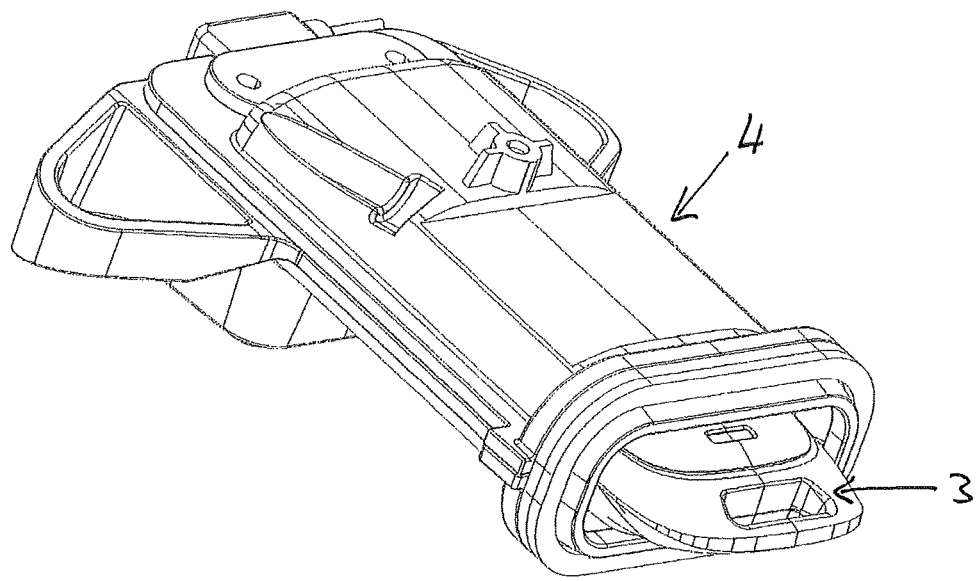
Figure 5B:
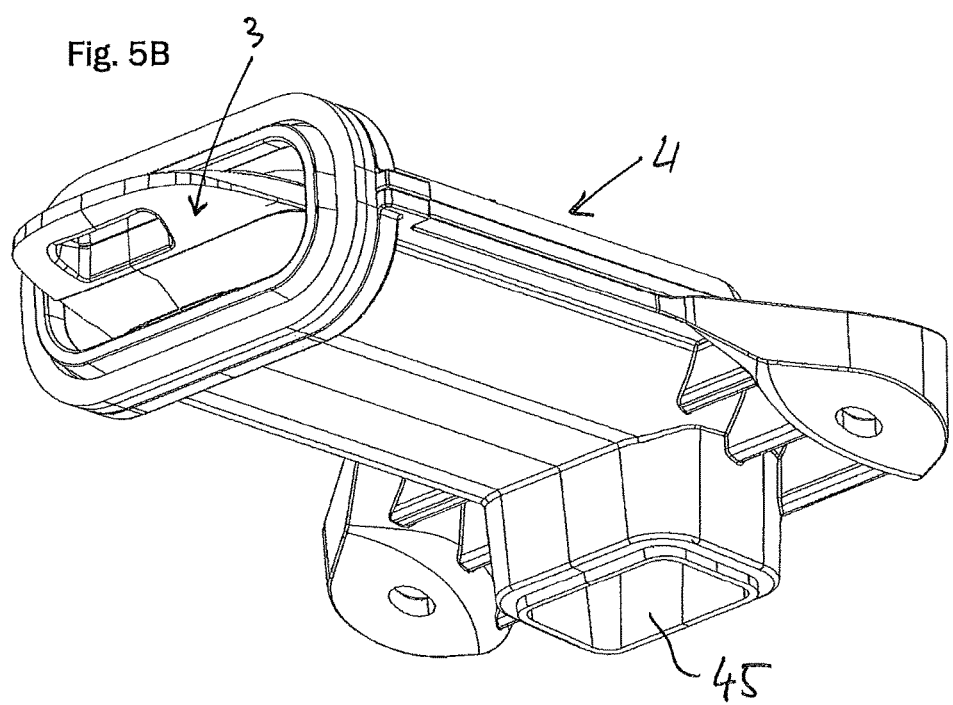
Figure 5C:
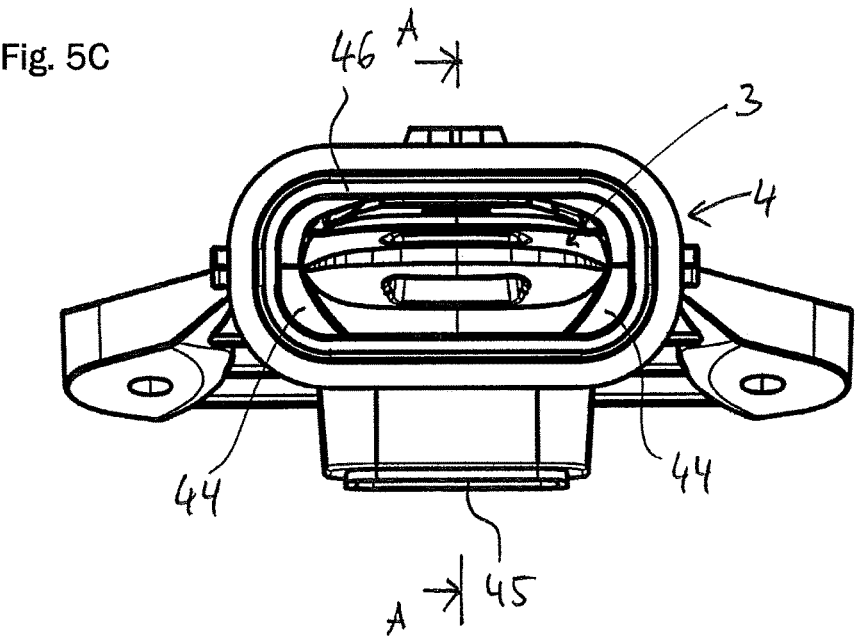
Figure 5D:
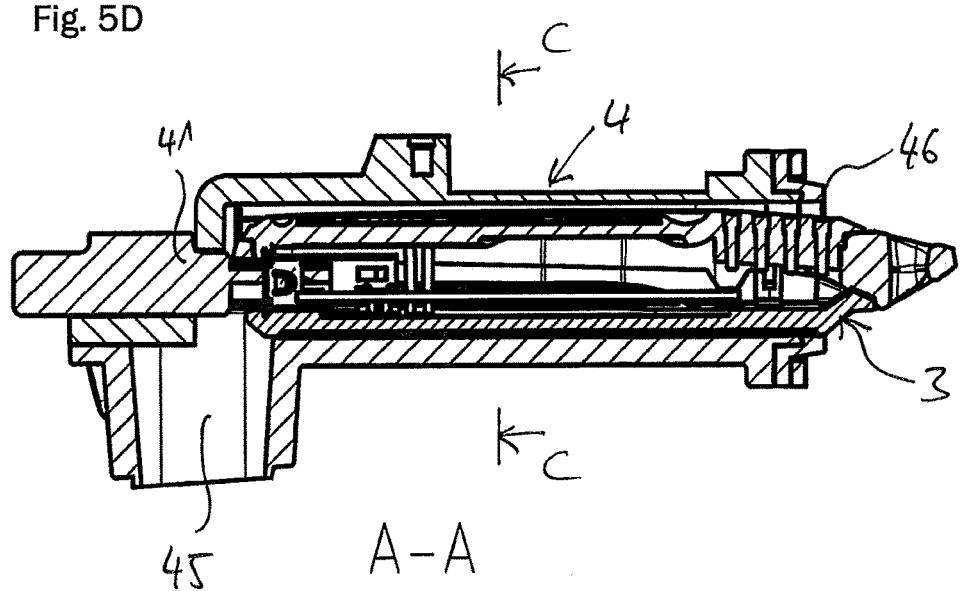
Figure 5E:
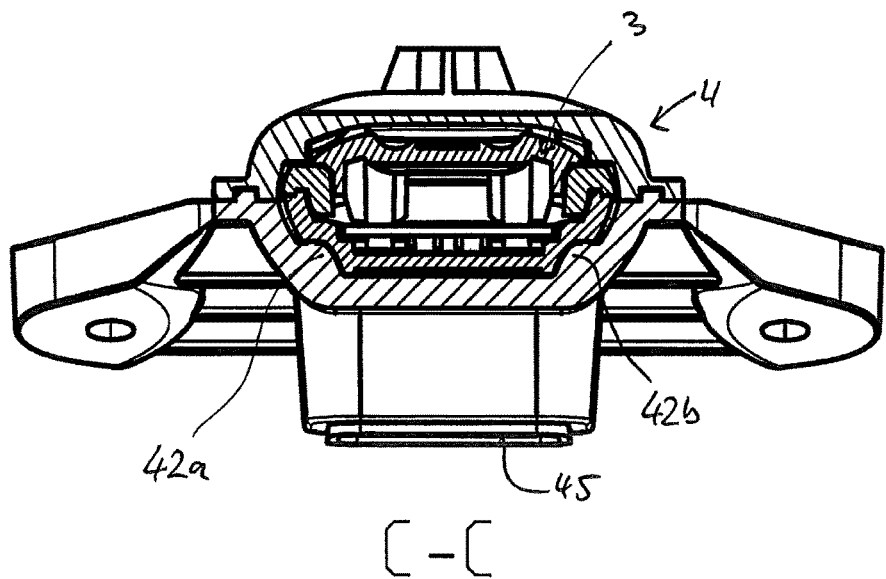
Figure 6:
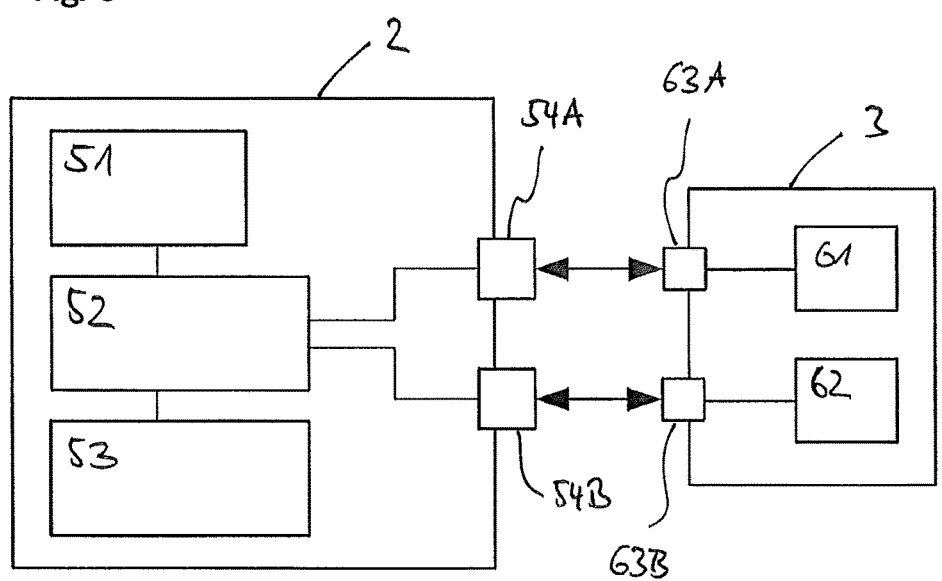

In the following description, the present invention will be explained by of examples while making reference to the accompanying drawings, wherein:

FIG. 1 shows an exemplary perspective drawing of a numerically controlled machine tool having an operator console, FIG. 2 shows an exemplary perspective drawing of an operator console of a control system according to an embodiment of the invention, FIG. 3A shows an exemplary perspective drawing of a mobile data carrier of a control system according to the embodiment of the invention, FIG. 3B shows another exemplary perspective drawing of the mobile data carrier of the control system according to the embodiment of the invention, FIG. 3C shows an exemplary top view of the mobile data carrier of the control system according to the embodiment of the invention, FIG. 3D shows an exemplary bottom-side view of the mobile data carrier of the control system according to the embodiment of the invention, FIG. 3E shows an exemplary lateral view of the mobile data carrier of the control system according to the embodiment of the invention, FIG. 3F shows an exemplary back-side view of the mobile data carrier of the control system according to the embodiment of the invention, FIG. 3G shows an exemplary front-side view of the mobile data carrier of the control system according to the embodiment of the invention, FIG. 4A shows an exemplary perspective drawing of a receiving slot member of the control system according to the embodiment of the invention, FIG. 4B shows another exemplary perspective drawing of the receiving slot member of the control system according to the embodiment of the invention, FIG. 4C shows an exemplary bottom-side view of the receiving slot member of the control system according to the embodiment of the invention, FIG. 4D shows an exemplary front-side view of the receiving slot member of the control system according to the embodiment of the invention, FIG. 4E shows an exemplary horizontal sectional view of the receiving slot member of the control system according to the embodiment of the invention, FIG. 4F shows an exemplary vertical sectional view of the receiving slot member of the control system according to the embodiment of the invention, FIG. 5A shows an exemplary perspective drawing of the receiving slot member according to the embodiment of the invention together with the received mobile data carrier, FIG. 5B shows another exemplary perspective drawing of the receiving slot member according to the embodiment of the invention together with the received mobile data carrier, FIG. 5C shows an exemplary front-side view of the receiving slot member according to the embodiment of the invention together with the received mobile data carrier, FIG. 5D shows an exemplary vertical sectional view of the receiving slot member according to the embodiment of the invention together with the received mobile data carrier, FIG. 5E shows another exemplary vertical sectional view of the receiving slot member according to the embodiment of the invention together with the received mobile data carrier, and FIG. 6 shows an exemplary schematic drawing of a control system according to a preferred embodiment of the present invention.

In the figures, similar or identical areas, parts, or elements are denoted by the same reference numerals.

FIG. 1 exemplarily shows a perspective drawing of a numerically controlled machine tool 100 connected to an operator console 2 for control of the machine tool by a user/operator. By operating the operator console 2, the user is enabled to control one or more of plural operation functions of the machine tool 100 related to machining of a workpiece at the machine tool, controlling movement of linear and rotary axes of the machine tool, and other actuators of the machine tool 100. In addition, if available at the machine tool, the user is enabled to control one or more of plural operation functions related to automatic tool changers, pallet changers, chip conveyors and coolant units of the machine tool.

Moreover, the machine tool 100 may be operable in plural selectable operation modes including, for example, operation modes such as an automatic mode in which all functions of the machine tool are available, a setup mode for setting up the machine tool and configurations of the machine tool and parts thereof, and a security mode for maintenance in which only limited functions of the machine tool are available and movement speeds of movable actuators such as linear and rotary axes are limited while a door of the machine tool may remain opened for manual interventions and observations. Depending on the selected operation mode, only a limited set of operation functions of the machine tool may be available to be controlled by the user and/or special functions may be still available but at a limited functionality.

FIG. 2 exemplary shows a perspective drawing of the operator console 2 of FIG. 1. In the present embodiment, the operator console 2 comprises a display 21 (display unit) and an input panel 22 (input unit). The input panel 22 may serve as input unit for a user to input control commands, including a command to select one of the plural operation modes. In addition, a status of different actuators (such as spindles, linear axes, rotary axes etc.) of the machine and operation thereof may be displayed on the display 21 allowing the user to monitor the operation of the machine tool 100. The display 21 may be a touch-sensitive screen adapted to further receive input of the user, in addition to the input of the input panel 22. Exemplarily, the operator console 2 is externally provided in this embodiment, but it may alternatively be integrated into a cabinet of the machine tool.

The input panel 22 may comprise plural input means such as a keypad 22a, buttons 222d, switches 22b, rotary knobs 22c, tracking balls, touchpads or the like for receiving manual operation input from the user for enabling the user to input control operations for control of a machine tool. The operator console 2 further comprises a receiving slot 23 as a receiving portion for receiving a mobile data carrier 3 for user authorization purposes in order to determine, on the basis of data stored on the mobile data carrier 3, which operation modes shall be selectable by the user and/or which operation functions shall be controllable by the user and to what extent in dependency of an authorization level and/or access rights of the user.

Accordingly, while the operator console 2 can be used by plural users, each user shall insert his or her individual mobile data carrier 3 into the receiving slot 23 in order to be logged on at the machine tool and to enable the user to control the machine tool only according to his or her individual authorization level and/or access rights, determined on the basis of authorization data received from the mobile data carrier 3 inserted into the receiving slot 23.

In addition, the user can load configuration data and/or control data to/from the mobile data carrier 3 from/to the control device (not shown) in the operator console 2.

Configuration data may comprise at least one of: settings configuration data for automatically configuring settings of an operating system of the control device in accordance with preferences and/or access rights of the user; application installation data adapted to install and/or update an application program at the control device for enhancing and/or adding control and operation functions available at the control device; application configuration data for automatically configuring one or more of a plurality of applications of the control device which are related with operation, control and monitoring functions of the machine tool in accordance with preferences and/or access rights of the user; tool configuration data indicative of tool properties of a tool to be equipped at the machine tool and or tool configuration data indicative of information which tools should be used by the machine tool during an operation function in order to machine a working piece, and at which places of a tool magazine of the machine tool these tools are located; and operation function configuration data used by an operation function of the machine tool as input data.

Control data comprises at least one of: numerical control program code data for automatically controlling a relative movement between a tool and a workpiece at the machine tool; calibration control data for automatically controlling one or more calibration operations at the machine tool; and workpiece model data indicative of a model of a workpiece to be machined at the machine tool.

In addition, the control device of the operator console may be adapted to store output data in a storage means of the mobile data carrier via the established communication connection, the output data comprising at least one of: operation function output data generated during execution of an operation function of the machine tool; machining history data related to the machining history of one or more workpieces machined at the machine tool; and operation history data related to the history of operation functions of the machine tool which have been selected/controlled by the user in the past.

FIG. 3A shows an exemplary perspective drawing of a mobile data carrier 3 of a control system according to the embodiment of the invention. The casing of the mobile data carrier 3 has an elongated shape extending from a back portion, which has a holding portion 34 to which a grip band can be attached, to a front portion which has an embedded female USB connector socket 31 of an USB interface (second communication interface) of the mobile data carrier 3. The mobile data carrier 3 is adapted to be inserted with its front portion which has the embedded female USB connector socket 31 into the receiving slot 23 of the operator panel 2.

On the top side of the mobile data carrier 3, there are exemplarily provided four LED openings 35. The LED openings 35 can be equipped with LEDs indicating whether the mobile data carrier is connected to the control device of the operator console 2. Also, by illuminating one or more of the LEDs, it can be indicated to the user which access level he/she is logged on to the control device of the operator console 2.

FIG. 3B shows another exemplary perspective drawing of the mobile data carrier of the control system according to the embodiment of the invention. Again, it can be seen that the back portion of the mobile data carrier 3 has the embedded female USB socket 31 of the USB interface. On a lower lateral side of the mobile data carrier 3, the casing is provided with an elongated guiding groove 32a that extends form the back portion of the mobile data carrier to a stopper portion 33a.

FIG. 3C shows an exemplary top view of the mobile data carrier of the control system according to the embodiment of the invention, and FIG. 3D shows an exemplary bottom-side view of the mobile data carrier of the control system according to the embodiment of the invention. In FIG. 3D, it is shown that both lower lateral sides of the mobile data carrier have respective elongated guiding grooves 32a and 32b that extend form the back portion of the mobile data carrier 3 to respective stopper portions 33a and 33b.

FIG. 3E shows an exemplary lateral view of the mobile data carrier of the control system according to the embodiment of the invention, FIG. 3F shows an exemplary back-side view of the mobile data carrier of the control system according to the embodiment of the invention, and FIG. 3G shows an exemplary front-side view of the mobile data carrier of the control system according to the embodiment of the invention.

FIG. 4A shows an exemplary perspective drawing of a receiving slot member 4 of the control system according to the embodiment of the invention (from an frontal-upper point of view). The receiving slot member 4 forms a part of the operator panel 2 described above, and has the receiving slot 23 into which the mobile data carrier 3 can be inserted.

The receiving slot member 4 has an opening 46 into which a user can insert the mobile data carrier 3. The horizontal width of the opening 46 is larger than a width of the mobile data carrier 3 for enabling easier insertion of the mobile data carrier 3. Adjacent to the opening 46, the receiving slot member 4 has a tapered portion 44 of the receiving slot 23 which has a width that decreases from the opening 46 towards the inner side of the receiving slot 23 and merges into a receiving portion 43 of the receiving slot 23. The horizontal width of the receiving portion 43 is adjusted to the width of the mobile data carrier 3.

On an inner end face side of the receiving slot 23, there is provided a male USB connector plug 41 of an USB interface (first communication interface) of the receiving slot member 4. When the mobile data carrier 3 is inserted with its front portion into the receiving slot 23 with an upper side facing upside, the male USB connector plug 41 of the receiving slot member 4 is plugged into the female USB connector socket 31 of the mobile data carrier 3.

The left and right lower lateral sides of the receiving portion 43 of the receiving slot 23 have respective elongated guiding protrusions 42a and 42b which are adapted to engage into the guiding grooves 32a and 32b of the mobile data carrier 3. This provides the advantage that the mobile data carrier 3 will be blocked by the guiding protrusions 42a and 42b when the user attempts to insert the mobile data carrier 3 with its back side having the holding portion 34 and when the user attempts to insert the mobile data carrier 3 with its front side but having the lower side facing upwards. Also, the guiding protrusions 42a and 42b can block objects other than the mobile data carrier 3.

Furthermore, the cross-sectional shapes of the guiding protrusions 42a and 42b and the cross-sectional shapes of the guiding grooves 32a and 32b are fitted to each other, and when inserting the mobile data carrier 3, the mobile data carrier 3 is guided in a correct position to the USB connector plug 41 for correctly connecting the USB connector plug 41 and the USB connector socket 31.

FIG. 4B shows another exemplary perspective drawing (from a lower point of view) of the receiving slot member 4 of the control system according to the embodiment of the invention, and FIG. 4C shows an exemplary bottom-side view of the receiving slot member 4 of the control system according to the embodiment of the invention.

As can be seen in FIGS. 4B and 4C, the receiving slot member 4 has an opening 45 which is arranged at a lower end portion of the receiving portion 43 of the receiving slot 23 and which allows dirt and soot that may be present in the receiving slot 23 to fall out of the receiving slot 23 near the lower end portion of the receiving portion 43. Specifically, especially if inserting the mobile data carrier 3 plural times by operators of machine tools in a factory work room, it may occur that work related dirt and soot from the factory work room may enter the receiving slot 23 and be pushed towards the end portion of the receiving portion 43 of the receiving slot 23 when inserting the mobile data carrier 3. In order to avoid that such dirt and soot may accumulate in the region of the end portion of the receiving portion 43 of the receiving slot 23, thereby potentially contaminating the male connector plug 41 or blocking the mobile data carrier 3 to be fully inserted, such dirt may fall out of the receiving slot 23 and cannot accumulate in the region of the end portion of the receiving portion 43 of the receiving slot 23.

FIG. 4D shows an exemplary front-side view of the receiving slot member 4 of the control system according to the embodiment of the invention. As can be seen in FIG. 4D, in addition to the lower guiding protrusions 42a and 42b, the receiving portion 43 of the receiving slot 23 may additionally be exemplarily provided with upper guiding protrusions 42c and 42d, which further may improve the mechanism of accurately guiding the mobile data carrier 3 during being inserted into the receiving slot 23 so that accurate connection between the connectors 41 and 31 may be achieved even more accurately.

FIG. 4E shows an exemplary horizontal sectional view of the receiving slot member 4 of the control system along the section B-B in FIG. 4D, and FIG. 4F shows an exemplary vertical sectional view of the receiving slot member of the control system along the section A-A in FIG. 4D.

The guiding protrusions 42a and 42b of the receiving portion 43 of the receiving slot 23 have an elongated shape and extend in parallel to each other and in a longitudinal direction (insertion direction of the mobile data carrier 3) of the receiving slot 23 and end portions thereof facing the direction towards the opening 46 form stopper portions 47a and 47b which come into contact with the stopper portions 33a and 33b or the mobile data carrier 3, respectively, when the guiding protrusions 42a and 42b engage into the guiding grooves 32a and 32b of the mobile data carrier 3, respectively, and when the mobile data carrier 3 is inserted into the receiving slot 23 up to a fully inserted position in which the connectors 31 and 41 are properly connected.

Accordingly, further movement of the mobile data carrier 3 into the insertion direction is blocked by the stopper portions 33a and 33b being in contact with the stopper portions 47a and 47b, respectively, in the fully inserted position. Accordingly, it can be prevented that users damage the connectors 31 and 41 even if a too high force is applied by the user when inserting the mobile data carrier 3.

FIG. 5A shows an exemplary perspective drawing of the receiving slot member 4 according to the embodiment of the invention together with the received mobile data carrier 3, wherein the mobile data carrier 3 is inserted into the receiving slot 23 up to the fully inserted position. FIG. 5B shows another exemplary perspective drawing of the receiving slot member 4 according to the embodiment of the invention together with the received mobile data carrier 3, wherein the mobile data carrier 3 is inserted into the receiving slot 23 up to the fully inserted position.

FIG. 5C shows an exemplary front-side view of the receiving slot member 4 according to the embodiment of the invention together with the received mobile data carrier 3, wherein the mobile data carrier 3 is inserted into the receiving slot 23 up to the fully inserted position. FIG. 5D shows an exemplary vertical sectional view of the receiving slot member 4 according to the embodiment of the invention together with the received mobile data carrier 3 along the section A-A in FIG. 5C. The male connector plug 41 of the receiving slot member 4 is connected to the female connector socket 31 of the mobile data carrier 3.

As can be seen in FIG. 5C, the height of the inner receiving portion of the receiving slot 23 is substantially equal (only slightly larger in order to allow for little clearance) than the height of the mobile data carrier 3 and the mobile data carrier 3 is received in the receiving slot such that most part thereof is received. This has the advantage that even if a force being perpendicular to the insertion direction is applied to the portion of the mobile data carrier 3 extending out of the receiving slot 23 in the fully inserted position, substantially no lateral force is applied to the connectors 31 and 41 so that damage of the connectors can be prevented. In case the connectors are USB connectors, the length of the portion of the mobile data carrier 3 (in the insertion direction) that is received inside the receiving slot 23 is preferably about more than three times the length of the male USB connector (preferably more than 3 cm and even more preferably more than 5 cm in case of a Type A male USB connector). For increasing stiffness of the mobile data carrier 3, the casing of the mobile data carrier 3 may be made of metal or at least comprise a frame made metal.

FIG. 5E shows another exemplary vertical sectional view of the receiving slot member 4 according to the embodiment of the invention together with the received mobile data carrier 3 along the section C-C in FIG. 5D. As can be seen in FIG. 5E, the cross-sectional shape of the casing of the mobile data carrier 3 is adapted to fit the cross-sectional shape of the receiving portion 43 of the receiving slot 23, and the cross-sectional shape of the guiding protrusions 42 and 42b of the receiving slot 23 fits the cross-sectional shape of the guiding grooves 32a and 32b of the mobile data carrier.

Especially because the upper cross sectional shape of the receiving portion 43 is different (asymmetrically) with respect to the lower cross sectional shape of the receiving portion 43, e.g. because the upper cross sectional shape of the receiving portion 43 has the guiding protrusions 42a and 42b, the mobile data carrier 3 can only be inserted with an upper side facing upwards (i.e. facing an upper side of the receiving portion 43) and with a lower side facing downwards (i.e. facing a lower side of the receiving portion 43). Accordingly, when the user attempts to insert the mobile data carrier upside down, the insertion movement will be blocked at least by the guiding protrusions 42a and 42b because they cannot engage with the guiding grooves 32a and 32b. Also, when the user attempts to insert the mobile data carrier with the wrong end (inserting the portion 34), the insertion movement will be blocked by the guiding protrusions 42a and 42b because they cannot engage with the guiding grooves 32a and 32b on the side of the portion 34 (see e.g. FIG. 3D). As a consequence, any incorrect insertion can be blocked physically and damage to the connectors due to wrongful insertion by the user can be prevented.

FIG. 6 shows an exemplary schematic drawing of a control system according to a preferred embodiment of the present invention. The system comprises a mobile data carrier 3 and a control device having units 51, 52 and 53 of an operator console 2. The control device has a processing unit 52 such as a CPU or the like, a memory unit 51 and an input/output unit 53 configured to receive input by a user, and first and third communication interfaces 54A and 54B. The first communication interface 54A and the third communication interface 54B are connected to the processing unit 52, respectively. The processing unit 52 is connected to the memory unit 51 and the input/output unit 53.

The mobile data carrier 3 comprises first and second memory means 61 and 62, and a second communication interface 63A and a fourth communication interface 63B, the second communication interface 63A being connected to the first memory means 61 and the fourth communication interface 63B being connected to the second memory means 62.

The first communication interface 54A of the control device is adapted to communicably connect to the second communication interface 63A of the mobile data carrier 3, and the third communication interface 54B of the control device is adapted to communicably connect to the fourth communication interface 63B of the mobile data carrier 3.

According to an aspect of the invention, the connection between the first and second communication interfaces 54A and 63A may be realized by a detachable wired connection, e.g., as discussed in connection with embodiments above, the second communication interface 63A may include the above described female connector socket 31 and the first communication interface 54A may include the above described male connector plug 41.

According to another aspect of the invention, the connection between the third and fourth communication interfaces 54B and 63B may be realized by a wireless connection, e.g., by Bluetooth, RFID, WLAN or the like. The third and fourth communication interfaces 54B and 63B may be adapted such that the wireless connection can be established when the mobile data carrier 3 and its communication interface 63A is directly connected via wired connection to the communication interface 54A. For example, when Bluetooth or a energy-efficient interface technology such as RFID is used, which may be limited with respect to transmission distance, the wireless connection can be established at least at a relative position between the operator panel 2 and the mobile data carrier 3 at least when the mobile data carrier 3 and its communication interface 63A is directly connected via wired connection to the communication interface 54A, e.g. at least in a fully inserted position of the receiving slot 23 as discussed above in exemplary embodiments. Then, the receiving slot member may have attached to it (or provided in parallel) a wireless receiver (not shown above), e.g. such as an RFID receiver adjacent to the receiving slot 23. Then, the mobile data carrier 3 may have an additional wireless transmitter (not shown above) such as an RFID transmitter.

The control device in the exemplary embodiment may enable a user to control a plurality of available operation functions of the machine tool. In order to control the operation functions, the user may input his/her commands manually, using the input unit 53. The input unit 53 may for example comprise several keys, touch screens, joy sticks, track balls, a mouse, etc.

In order to be able to input his commands, the user may have to couple the mobile data carrier 3 to the control device (e.g. by inserting it into the receiving slot 23 as discussed above) such that the interfaces 54A and 63A communicate with each other, and that interfaces 54B and 63B communicate with each other.

In this case, authorization data stored in the memory unit 62 of the mobile data carrier 3 can be read out via interfaces 54B and 63B from the memory means 62. The transferred authorization data can be analyzed by the processing unit 52 and may be temporarily stored in the memory unit 51. The processing unit 52 of the control device 2 determines, based on the received authorization data, if the user is allowed to operate the input unit 53, and if yes, which of the available operation functions of the machine tool he is allowed to control, using the input unit 53. If, for example, the processing unit 52 decides that the user can use all operation functions of the machine tool, then all signals sent from the input unit 53 to the processing unit 52 may be converted into corresponding operation function instructions sent to the machine tool. Otherwise, some (or all) of the input signals sent from the input unit 53 to the processing unit 52 may be ignored, i.e. not converted into corresponding operation function instructions. If authorization data for the user is stored on the memory means 62, the memory means 62 is preferably read-only memory in order to prevent inadmissible modification of authorization data.

The mobile data carrier 3 can additionally be coupled to the control device 2 via the interfaces 54A and 63A in order to read out data from the memory means 61. In this case, other data may be exchanged between the mobile data carrier 3 and the control device 2 via these interfaces 54A and 63A. For example, operation function program code stored in the memory unit 61 may be transferred to the processing unit 52 and stored in the memory unit 51 as a selectable operation function which can be selected/controlled by the user via the input unit 53. Also, the exchanged data may comprise operation function output data generated during execution of the operation function of the machine tool which is transferred from the control device 2 to the mobile data carrier 3 and stored in the memory unit 61.

The same may apply for data related to the processing history of a working piece machined by the machine tool. Further, this may also apply to data related to the history of operation functions of the machine tool which have been selected/controlled by the user in the past. On the other hand, if for example the user enters a command into the input unit 53 which triggers an operation function which requires input, the processing unit 52 may search whether corresponding operation function input data is stored in the memory unit 61 of the mobile data carrier 3, and if yes, transfer this data to the processing unit 52 in order to be used in conjunction with the selected operation function. Such operation function input data may for example be information specifying which tools should be used by the machine tool during an operation function in order to machine a working piece, and where these tools are located.

The processing unit 52 may be configured, after the user has terminated his work at the control device, to transfer all data generated in the control device 2 which is related to the operation functions carried out to storage means 61 of the mobile data carrier 3. In response to such a request, the processing unit 52 may send the corresponding data to the mobile data carrier 3 via interfaces 54A and 63A. The transmission of data between the mobile data carrier 3 and the control device 2 may be automatically triggered as soon as the interfaces communicate with each other. Alternatively, the user may be requested by the input unit 53 to give his consent that data is exchanged between the control device 2 and the mobile data carrier 3.

Communication between the interfaces 54A and 63A, and between the interfaces 54B and 63B may be established simultaneously. Alternatively, in a first coupling action, only communication between the interfaces 54B and 63B is established (in order to read authorization data), and, after having initiated an additional coupling action, communication can be established between the interfaces 54A and 63A.

For example, assuming that the control device 2 comprises the slot 23, as exemplarily discussed above, and assuming that the mobile data carrier 3 can be inserted into the slot 23, in a first inserting position, only communication between the interfaces 54B and 63B may be established, wherein, upon further pushing the mobile data carrier 3 into the slot 23, a second coupling position is reached where also the physical connection between the interfaces 54A and 63A can be established (e.g. when the connector plug 41 connects to the connector socket 31). Still, even though physical connection between the interfaces 54A and 63A may be established already, it may be preferable that the authorization data received at the control device via the interfaces 54B and 63B is checked first as to whether the user is authorized to exchange data or which type of data he/she is authorized to exchange between the mobile data carrier 3 and the control device, and to then activate/enable communication via the interfaces 54A and 63A or not.

Specifically, the control device may be configured to enable the user to control a plurality of available control functions of the machine tool 100 depending on an authorization level and/or access rights of the user. The storage means 62 of the mobile data carrier 3 may store access authorization data being indicative of the authorization level and/or access rights of the user, and the control device is then adapted to read access authorization data stored in the storage means 62 via an established connection between the communication interfaces 54B and 63B for determining the authorization level and/or access rights of the user, and/or the storage means 62 stores access authorization data being indicative of the authorization level and/or access rights of the user, and the other storage means 61 stores configuration data and/or control data.

The mobile data carrier 3 may be adapted to be communicably connected to the control device of the operator console 2 via the wireless first connection being established between the wireless interfaces 54B and 63B and via a second connection being established between the communication interfaces 54A and 63B, e.g. when the mobile data carrier 3 is received in the receiving slot 23 of the operator console 2 as exemplarily discussed above.

On the other hand, the control device can be adapted to read access authorization data stored in the storage means 62 via the established wireless first connection for determining the authorization level and/or access rights of the user and is further adapted to read configuration data from the storage means 61 via the established second connection for configuring the control device and/or control data for controlling operation of the machine tool 100 based on the control data.

The control device can be further adapted to write configuration data and/or control data to the storage means 61 via the established second connection (interfaces 63A and 54A), but the other storage means 62 is a read-only, memory for preventing the control device to overwrite or alter data stored in the storage means 62.

Features, components and specific details of the structures of the above-described embodiments may be exchanged or combined to form further embodiments optimized for the respective application. As far as those modifications are readily apparent for an expert skilled in the art they shall be disclosed implicitly by the above description without specifying explicitly every possible combination, for the sake of conciseness of the present description.

The invention claimed is:

1. A system for control of a numerically controlled machine tool by a user, comprising:
   an operator console being operable by the user; and
   a mobile data carrier;
   wherein the operator console has a control device for control of the machine tool and a receiving slot for receiving the mobile data carrier, the control device of the operator console having a first communication interface adapted to be communicably connected to a second communication interface of the mobile data carrier,
   wherein the second communication interface includes a female connector socket and the first communication interface includes a male connector plug provided at an inner end face portion of the receiving slot for being plugged into the female connector socket of the mobile data carrier when the mobile data carrier is received in the receiving slot,
   wherein the mobile data carrier has an elongated casing having an upper outer side and a lower outer side opposite to the upper outer side, and having an insertion portion being formed at a first end of the mobile data carrier on the side of the female connector socket, and the receiving slot has an elongated shape having an upper inner side and a lower inner side opposite to the upper inner side,
   wherein the mobile data carrier has a first memory storing a first type of data and a second memory storing a second type of data,
   wherein the control device of the operator console has a wireless third communication interface and the mobile data carrier has a wireless fourth communication interface, wherein the mobile data carrier is adapted to be communicably connected to the control device of the operator console via a wireless first connection being established between the wireless third and fourth communication interfaces and via a second connection being established between the first and second communication interfaces, when the mobile data carrier is received in the receiving slot of the operator console, and wherein the control device is adapted to read data of the first type of data stored in the first memory via the established wireless first connection and is further adapted to read data of the second type of data from the second memory via the established second connection.

2. The system according to claim 1, wherein a cross-sectional shape of a receiving portion of the receiving slot is adapted to fit a cross-sectional shape of the insertion portion of the casing of the mobile data carrier such that the insertion portion of the mobile data carrier is insertable into the receiving portion of the receiving slot only such that a first outer side of the casing of the mobile data carrier faces a first inner side of the receiving slot and a second outer side of the casing of the mobile data carrier faces a second inner side of the receiving slot.

3. The system according to claim 1, wherein a cross-sectional shape of a receiving portion of the receiving slot is formed to fit a cross-sectional shape of the insertion portion of the mobile data carrier such that movement of the mobile data carrier into directions perpendicular to an insertion direction of the receiving slot is blocked and/or such that rotation of the mobile data carrier about the insertion direction is blocked, when the insertion portion of the mobile data carrier is received in the receiving portion of the receiving slot.

4. The system according to claim 1, wherein an opening of the receiving slot has a larger width than a width of the insertion portion of the mobile data carrier, and a width of a front portion of the receiving slot decreases from the opening to the receiving portion of the receiving slot; and/or the opening of the receiving slot has a larger height than a height of the insertion portion of the mobile data carrier, and a height of the front portion of the receiving slot decreases from the opening to the receiving portion of the receiving slot.

5. The system according to claim 1, wherein the casing of the mobile data carrier has a holding portion being formed at a second end of the mobile data carrier on the opposite side of the female connector socket, wherein a cross-sectional shape of the holding portion of the casing of the mobile data carrier is formed such that the holding portion is blocked by the cross-sectional shape of the receiving portion of the receiving slot.

6. The system according to claim 1, wherein the receiving portion of the receiving slot has at least one first stopper portion and the insertion portion of the casing of the mobile data carrier has at least one second stopper portion, the at least one first stopper portion being adapted to come into contact with the at least one second stopper portion for blocking movement of the mobile data carrier into an insertion direction, when the insertion portion of the mobile data carrier is inserted into the receiving portion of the receiving slot up to a fully inserted position of the mobile data carrier.

7. The system according to claim 1, wherein the receiving portion of the receiving slot has at least one guiding protrusion and the insertion portion of the casing of the mobile data carrier has at least one guiding groove adapted to fit the at least one guiding protrusion of the receiving portion, the at least one guiding protrusion being adapted to engage with the at least one guiding groove when inserting the insertion portion of the casing of the mobile data carrier into the receiving portion of the receiving slot; and/or the receiving portion of the receiving slot has at least one guiding groove and the insertion portion of the casing of the mobile data carrier has at least one guiding protrusion adapted to fit the at least one guiding groove of the receiving portion, the at least one guiding protrusion being adapted to engage with the at least one guiding groove when inserting the insertion portion of the casing of the mobile data carrier into the receiving portion of the receiving slot.

8. The system according to claim 1, wherein the casing of the mobile data carrier comprises an outer frame portion being made of metal.

9. The system according to claim 1, wherein the female connector socket of the mobile data carrier is a female USB connector socket and the male connector plug of the control device is a male USB connector plug.

10. The system according to claim 1, wherein the control device is configured to enable the user to control a plurality of available control functions of the machine tool depending on an authorization level and/or access rights of the user.

11. The system according to claim 10, wherein the control device is further adapted to write configuration data and/or control data to the second memory via the established second connection; and the first memory is a read-only memory for preventing the control device to overwrite or alter data stored in the first memory.

12. The system according to claim 10, wherein the wireless third communication interface of the control device has an RFID reader and the wireless fourth communication interface of the mobile data carrier has an RFID transponder.

13. The system according to claim 1, wherein a bottom of the receiving slot comprises a dirt opening provided at an inner end portion of the receiving slot allowing dirt being pushed into the receiving slot by the inserted mobile data carrier to be removed from the receiving slot.

14. The system according to claim 1, wherein the first type of data includes access authorization data being indicative of the authorization level and/or access rights of the user and the second type of data includes configuration data and/or control data.

15. An operator console for use in a system for control of a numerically controlled machine tool by a user, comprising:
a control device for control of the machine tool, the control device having a first communication interface; and
a receiving slot for receiving a mobile data carrier,
wherein the receiving slot has an elongated shape having an upper inner side and a lower inner side opposite to the upper inner side,
wherein the mobile data carrier has: (i) an elongated casing having an upper outer side and a lower outer side opposite to the upper outer side, (ii) a second communication interface including a female connector socket, (iii) an insertion portion formed at a first end of the mobile data carrier on the side of the female connector socket, (iv) a first memory storing a first type of data, and (v) a second memory storing a second type of data,
wherein the control device of the operator console has a first communication interface adapted to be communicably connected to the second communication interface of the mobile data carrier,
wherein the first communication interface includes a male connector plug provided at an inner end face portion of the receiving slot for being plugged into the female connector socket of the mobile data carrier when the mobile data carrier is received in the receiving slot, wherein the control device of the operator console has a wireless third communication interface adapted to be communicably connected to a wireless fourth communication interface of the mobile data carrier, wherein the control device of the operator console is adapted to be communicably connected to the mobile data carrier via a wireless first connection being established between the wireless third and fourth communication interfaces and via a second connection being established between the first and second communication interfaces, when the mobile data carrier is received in the receiving slot of the operator console, and wherein the control device is adapted to read data of the first type of data stored in the first memory via the established wireless first connection and is further adapted to read data of the second type of data from the second memory via the established second connection.

16. A mobile data carrier for use in a system for control of a numerically controlled machine tool by a user, comprising:

a second communication interface including a female connector socket; and an elongated casing having an upper outer side and a lower outer side opposite to the upper outer side, and having an insertion portion being formed at a first end of the mobile data carrier on the side of the female connector socket, the mobile data carrier being adapted to be insertable into a receiving slot of an operator console being operable by the user, the operator console having a control device for control of the machine tool, the receiving slot having an elongated shape having an upper inner side and a lower inner side opposite to the upper inner side, and the second communication interface of the mobile data carrier being adapted to be communicably connected to a first communication interface of the control device, wherein the female connector socket of the mobile data carrier is adapted to be connected to a male connector plug provided at an inner end face portion of the receiving slot when the mobile data carrier is received in the receiving slot, wherein the mobile data carrier has a first memory storing a first type of data and a second memory storing a second type of data, wherein the mobile data carrier has a wireless fourth communication interface adapted to be communicably connected to a wireless third communication interface of the control device of the operator console, wherein the mobile data carrier is adapted to be communicably connected to the control device of the operator console via a wireless first connection being established between the wireless third and fourth communication interfaces and via a second connection being established between the first and second communication interfaces, when the mobile data carrier is received in the receiving slot of the operator console, and wherein the mobile data carrier is adapted to enable the control device to read data of the first type of data stored in the first memory via the established wireless first connection and is further adapted to read data of the second type of data from the second memory via the established second connection.

* * * * *